(12) United States Patent
Leahy et al.

(10) Patent No.: US 9,494,711 B2
(45) Date of Patent: Nov. 15, 2016

(54) ADAPTIVE WEIGHTING OF GEOPHYSICAL DATA TYPES IN JOINT INVERSION

(76) Inventors: Garrett M Leahy, Kerrville, TX (US); Christopher DiCaprio, Houston, TX (US); Charlie Jing, Houston, TX (US); Anoop A Mullur, Houston, TX (US); Rebecca L Saltzer, Houston, TX (US); Jan Schmedes, Bellaire, TX (US)

( * ) Notice: Subject to any disclaimer, the term of this patent is extended or adjusted under 35 U.S.C. 154(b) by 354 days.

(21) Appl. No.: 14/128,890

(22) PCT Filed: May 9, 2012

(86) PCT No.: PCT/US2012/037108
§ 371 (c)(1),
(2), (4) Date: Dec. 23, 2013

(87) PCT Pub. No.: WO2013/012470
PCT Pub. Date: Jan. 24, 2013

(65) Prior Publication Data
US 2014/0136170 A1    May 15, 2014

Related U.S. Application Data

(60) Provisional application No. 61/510,363, filed on Jul. 21, 2011.

(51) Int. Cl.
*G01V 1/00* (2006.01)
*G01V 99/00* (2009.01)
(Continued)

(52) U.S. Cl.
CPC ............ *G01V 99/005* (2013.01); *G01V 11/00* (2013.01); *G01V 1/282* (2013.01); *G01V 1/30* (2013.01);
(Continued)

(58) Field of Classification Search
CPC ...... G01V 99/005; G01V 11/00; G01V 1/30; G01V 3/38; G01V 7/00; G01V 2210/616; G01V 1/282; G01V 1/306; G01V 2210/612; G01V 2210/614; G01V 2210/62
USPC ................................................ 703/2; 367/73
See application file for complete search history.

(56) References Cited

U.S. PATENT DOCUMENTS

| 4,742,305 A | 5/1988 | Stolarczyk |
| 4,792,761 A | 12/1988 | King et al. |

(Continued)

FOREIGN PATENT DOCUMENTS

| GB | 2 402 745 | 8/2005 |
| GB | 2 410 635 | 12/2006 |

(Continued)

OTHER PUBLICATIONS

Johnson, J.M. (1996), "The 1964 Prince William Sound earthquake: Joint inversion of tsunami and geodetic data," *J. of Geophysical Research* 101(B1), pp. 523-532.

(Continued)

*Primary Examiner* — Daniel L Murphy
(74) *Attorney, Agent, or Firm* — ExxonMobil Upstream Reseach-Law Department

(57) ABSTRACT

Method for adaptive weighting of geophysical data types in iterative joint inversion to speed convergence and aid escape from local minima of the penalty (objective) function. Two or more geophysical data sets (11) representing a region of interest are obtained, and are jointly inverted to infer models of the physical properties that affect the particular types of data used. The misfit for each data type is a weighted tem in the penalty function (13). The invention involves changing the weights (51) as the iteration cycles progress when the iteration convergence criteria are satisfied (15), to see if they remain satisfied (52) with the modified penalty function.

15 Claims, 6 Drawing Sheets

(51) Int. Cl.
*G01V 11/00* (2006.01)
*G01V 1/30* (2006.01)
*G01V 3/38* (2006.01)
*G01V 7/00* (2006.01)
*G01V 1/28* (2006.01)

(52) U.S. Cl.
CPC .......... *G01V 1/306* (2013.01); *G01V 3/38* (2013.01); *G01V 7/00* (2013.01); *G01V 2210/612* (2013.01); *G01V 2210/614* (2013.01); *G01V 2210/616* (2013.01); *G01V 2210/62* (2013.01)

(56) References Cited

U.S. PATENT DOCUMENTS

| | | |
|---|---|---|
| 4,831,383 A | 5/1989 | Ohnishi et al. |
| 4,875,015 A | 10/1989 | Ward |
| 5,050,129 A | 9/1991 | Schultz |
| 5,175,500 A | 12/1992 | McNeill |
| 5,189,644 A | 2/1993 | Wood |
| 5,210,691 A | 5/1993 | Freedman et al. |
| 5,253,327 A | 10/1993 | Yoshihara |
| 5,265,192 A | 11/1993 | McCormack |
| 5,357,893 A | 10/1994 | Ruffa |
| 5,373,443 A | 12/1994 | Lee et al. |
| 5,406,206 A | 4/1995 | Safinya et al. |
| 5,467,018 A | 11/1995 | Ruter et al. |
| 5,563,513 A | 10/1996 | Tasci et al. |
| 5,594,343 A | 1/1997 | Clark et al. |
| 5,706,194 A | 1/1998 | Neff et al. |
| 5,764,515 A | 6/1998 | Guerillot et al. |
| 5,770,945 A | 6/1998 | Constable |
| 5,825,188 A | 10/1998 | Montgomery et al. |
| 5,835,883 A | 11/1998 | Neff et al. |
| 5,841,733 A | 11/1998 | Bouyoucos et al. |
| 5,884,227 A | 3/1999 | Rabinovich et al. |
| 5,905,657 A | 5/1999 | Celniker |
| 5,917,942 A | 6/1999 | Ehsani et al. |
| 6,037,776 A | 3/2000 | McGlone |
| 6,049,760 A | 4/2000 | Scott |
| 6,088,656 A | 7/2000 | Ramakrishnan et al. |
| 6,094,400 A | 7/2000 | Ikelle |
| 6,101,448 A | 8/2000 | Ikelle et al. |
| 6,115,670 A | 9/2000 | Druskin et al. |
| 6,138,075 A | 10/2000 | Yost |
| 6,181,138 B1 | 1/2001 | Hagiwara et al. |
| 6,253,100 B1 | 6/2001 | Zhdanov |
| 6,253,627 B1 | 7/2001 | Lee et al. |
| 6,256,587 B1 | 7/2001 | Jericevic et al. |
| 6,278,948 B1 | 8/2001 | Jorgensen et al. |
| 6,304,086 B1 | 10/2001 | Minerbo et al. |
| 6,311,132 B1 | 10/2001 | Rosenquist et al. |
| 6,332,109 B1 | 12/2001 | Sheard et al. |
| 6,339,333 B1 | 1/2002 | Kuo |
| 6,393,363 B1 | 5/2002 | Wilt et al. |
| 6,424,918 B1 | 7/2002 | Jorgensen et al. |
| 6,430,507 B1 | 8/2002 | Jorgensen et al. |
| 6,466,021 B1 | 10/2002 | MacEnany |
| 6,470,274 B1 | 10/2002 | Mollison et al. |
| 6,476,609 B1 | 11/2002 | Bittar |
| 6,493,632 B1 | 12/2002 | Mollison et al. |
| 6,502,037 B1 | 12/2002 | Jorgensen et al. |
| 6,529,833 B2 | 3/2003 | Fanini et al. |
| 6,533,627 B1 | 3/2003 | Ambs |
| 6,534,986 B2 | 3/2003 | Nichols |
| 6,593,746 B2 | 7/2003 | Stolarczyk |
| 6,594,584 B1 | 7/2003 | Omeragic et al. |
| 6,671,623 B1 | 12/2003 | Li |
| 6,675,097 B2 | 1/2004 | Routh et al. |
| 6,686,736 B2 | 2/2004 | Schoen et al. |
| 6,711,502 B2 | 3/2004 | Mollison et al. |
| 6,724,192 B1 | 4/2004 | McGlone |
| 6,739,165 B1 | 5/2004 | Strack |
| 6,765,383 B1 | 7/2004 | Barringer |
| 6,813,566 B2 | 11/2004 | Hartley |
| 6,816,787 B2 | 11/2004 | Ramamoorthy et al. |
| 6,842,006 B2 | 1/2005 | Conti et al. |
| 6,842,400 B2 | 1/2005 | Blanch et al. |
| 6,846,133 B2 | 1/2005 | Martin et al. |
| 6,876,725 B2 | 4/2005 | Rashid-Farrokhi et al. |
| 6,883,452 B1 | 4/2005 | Gieseke |
| 6,888,623 B2 | 5/2005 | Clements |
| 6,901,029 B2 | 5/2005 | Raillon et al. |
| 6,901,333 B2 | 5/2005 | Van Riel et al. |
| 6,914,433 B2 | 7/2005 | Wright et al. |
| 6,950,371 B2 | 9/2005 | Herkenhoff et al. |
| 6,950,747 B2 | 9/2005 | Byerly |
| 6,957,708 B2 | 10/2005 | Chemali et al. |
| 6,958,610 B2 | 10/2005 | Gianzero |
| 6,977,866 B2 | 12/2005 | Huffman et al. |
| 6,985,403 B2 | 1/2006 | Nicholson |
| 6,993,433 B2 | 1/2006 | Chavarria et al. |
| 6,999,880 B2 | 2/2006 | Lee |
| 7,002,349 B2 | 2/2006 | Barringer |
| 7,002,350 B1 | 2/2006 | Barringer |
| 7,023,213 B2 | 4/2006 | Nichols |
| 7,039,525 B2 | 5/2006 | Mittet |
| 7,062,072 B2 | 6/2006 | Anxionnaz et al. |
| 7,092,315 B2 | 8/2006 | Olivier |
| 7,109,717 B2 | 9/2006 | Constable |
| 7,113,869 B2 | 9/2006 | Xue |
| 7,114,565 B2 | 10/2006 | Estes et al. |
| 7,116,108 B2 | 10/2006 | Constable |
| 7,126,338 B2 | 10/2006 | MacGregor et al. |
| 7,142,986 B2 | 11/2006 | Moran |
| 7,187,569 B2 | 3/2007 | Sinha et al. |
| 7,191,063 B2 | 3/2007 | Tompkins |
| 7,203,599 B1 | 4/2007 | Strack et al. |
| 7,227,363 B2 | 6/2007 | Gianzero et al. |
| 7,250,768 B2 | 7/2007 | Ritter et al. |
| 7,257,049 B1 | 8/2007 | Laws et al. |
| 7,262,399 B2 | 8/2007 | Hayashi et al. |
| 7,262,602 B2 | 8/2007 | Meyer |
| 7,307,424 B2 | 12/2007 | MacGregor et al. |
| 7,328,107 B2 | 2/2008 | Strack et al. |
| 7,337,064 B2 | 2/2008 | MacGregor et al. |
| 7,347,271 B2 | 3/2008 | Ohmer et al. |
| 7,356,412 B2 | 4/2008 | Tompkins |
| 7,362,102 B2 | 4/2008 | Andreis |
| 7,363,280 B2 | 4/2008 | Jin et al. |
| 7,382,135 B2 | 6/2008 | Li et al. |
| 7,383,128 B2 | 6/2008 | Chandler |
| 7,400,977 B2 | 7/2008 | Alumbaugh et al. |
| 7,411,399 B2 | 8/2008 | Reddig et al. |
| 7,453,763 B2 | 11/2008 | Johnstad |
| 7,456,632 B2 | 11/2008 | Johnstad et al. |
| 7,477,160 B2 | 1/2009 | Lemenager et al. |
| 7,482,813 B2 | 1/2009 | Constable et al. |
| 7,487,133 B2 | 2/2009 | Kropaczek et al. |
| 7,502,690 B2 | 3/2009 | Thomsen et al. |
| 7,504,829 B2 | 3/2009 | Watts |
| 7,536,262 B2 | 5/2009 | Hornbostel et al. |
| 7,542,851 B2 | 6/2009 | Tompkins |
| 7,636,275 B2 | 12/2009 | Anno et al. |
| 7,659,721 B2 | 2/2010 | MacGregor et al. |
| 7,660,188 B2 | 2/2010 | Meldahl |
| 7,683,625 B2 | 3/2010 | Milne et al. |
| 7,805,250 B2 | 9/2010 | Colombo et al. |
| 7,822,552 B2 | 10/2010 | Bittleston |
| 7,840,394 B2 | 11/2010 | Madatov et al. |
| 7,884,612 B2 | 2/2011 | Conti et al. |
| 7,895,562 B2 | 2/2011 | Gray et al. |
| 7,928,732 B2 | 4/2011 | Nichols |
| 8,000,945 B2 | 8/2011 | Rogers et al. |
| 8,008,920 B2 | 8/2011 | Lu et al. |
| 8,098,543 B2 | 1/2012 | Bachrach et al. |
| 8,099,239 B2 | 1/2012 | MacGregor et al. |
| 8,255,166 B2 | 8/2012 | Tonnellot et al. |
| 8,363,509 B2 | 1/2013 | Colombo et al. |
| 8,577,660 B2 | 11/2013 | Wendt et al. |
| 2002/0172329 A1 | 11/2002 | Rashid-Farrokhi et al. |
| 2005/0128874 A1 | 6/2005 | Herkenhoff et al. |
| 2005/0237063 A1 | 10/2005 | Wight et al. |

(56) References Cited

U.S. PATENT DOCUMENTS

| | | |
|---|---|---|
| 2006/0186887 A1 | 8/2006 | Strack et al. |
| 2007/0288211 A1 | 12/2007 | MacGregor et al. |
| 2008/0007265 A1 | 1/2008 | Milne et al. |
| 2008/0008920 A1 | 1/2008 | Alexandrovichserov et al. |
| 2008/0059075 A1 | 3/2008 | Colombo et al. |
| 2008/0105425 A1 | 5/2008 | MacGregor et al. |
| 2008/0106265 A1 | 5/2008 | Campbell |
| 2009/0204330 A1 | 8/2009 | Thomsen et al. |
| 2009/0243613 A1 | 10/2009 | Lu et al. |
| 2009/0303834 A1 | 12/2009 | Sengupta et al. |
| 2009/0306900 A1 | 12/2009 | Jing et al. |
| 2009/0309599 A1 | 12/2009 | Ziolkowski |
| 2010/0004870 A1 | 1/2010 | Tonnellot et al. |
| 2010/0014384 A1* | 1/2010 | Colombo ............... G01V 1/303 367/73 |
| 2010/0074053 A1 | 3/2010 | Jaiswal et al. |
| 2010/0177595 A1 | 7/2010 | Khare et al. |
| 2010/0179761 A1 | 7/2010 | Burtz et al. |
| 2011/0139462 A1 | 6/2011 | Bourne |
| 2011/0255371 A1 | 10/2011 | Jing et al. |

FOREIGN PATENT DOCUMENTS

| | | |
|---|---|---|
| WO | WO 98/07050 | 2/1998 |
| WO | WO 2004/109338 | 12/2004 |
| WO | WO 2006/052145 | 5/2006 |
| WO | WO 2006/073115 | 7/2006 |
| WO | WO 2008/054880 | 5/2008 |
| WO | WO 2008/062024 | 5/2008 |
| WO | WO 2009/126566 | 10/2009 |
| WO | WO 2010/080366 | 7/2010 |

OTHER PUBLICATIONS

Julia, J. et al. (2000), "Joint inversion of receiver function and surface wave dispersion observations," *Geophys. J. Intl.* 145, pp. 99-112.

Linde, N. et al. (2006), "Improved hydrogeophysical characterization using joint inversion of cross-hole electrical resistance and ground-penetrating radar traveltime data," *Water Resources Research* 42, 16 pgs.

Lines, L.R. et al. (1988), "Cooperative inversion of geophysical data," *Geophysics* 53(1), pp. 8-20.

Moorkamp, J. et al. (2011), "A framework for 3-D joint inversion of MT, gravity and seismic refraction data," *Geophysical J. Int.* 184, pp. 477-493.

Vozoff, K. et al. (1975), "Joint Inversion of Geophysical Data," *Geophys. J.R. astr. Soc.* 42, pp. 977-991.

Doetsch, J. et al., "Zonation for 3D aquifer characterization based on joint inversions of multimethod crosshole geophysical data," *Geophysics* 75(6), pp. G53-G64 (Nov.-Dec. 2010).

Gallardo, L.A. et al., "A quadratic programming approach for joint image reconstruction: mathematical and geophysical examples," *Inverse Problems* 21, pp. 435-452 (2005).

Johnson, T.C. et al., "Data-domain correlation approach for joint hydrogeologic inversion of time-lapse hydrogeologic and geophysical data," *Geophysics* 74(6), pp. F127-F140 (Nov. 1, 2009).

Lelièvre, P.G. et al., "Joint inversion of seismic traveltimes and gravity data on unstructured grids with application to mineral exploration," SEG Denver 2010 Annual Meeting, pp. 1758-1762 (2010).

\* cited by examiner

ADAPTIVE WEIGHTING OF GEOPHYSICAL DATA TYPES IN JOINT INVERSION

CROSS-REFERENCE TO RELATED APPLICATION

This application is the National Stage entry under 35 U.S.C. 371 of PCT/US2012/037108 that published as WO 2013/012470 and was filed on May 9 2012, which claims the benefit of U.S. Provisional Application No. 61/510,363, filed Jul. 21 2011, entitled ADAPTIVE WEIGHTING OF GEOPHYSICAL DATA TYPES IN JOINT INVERSION, the entirety of which is incorporated by reference herein.

FIELD OF THE INVENTION

The invention relates generally to the field of geophysical prospecting. Specifically, the invention is a method for determining a subsurface property model though joint inversion of multiple geophysical data types.

BACKGROUND OF THE INVENTION

Obtaining models of subsurface properties is of value to extractive industries (for example, hydrocarbon production or mining) Direct sampling via drill cores can provide constraints, but direct sampling is infeasible over large areas, particularly in challenging environments. Remote sensing via geophysical data (e.g. seismic waves, gravity, electromagnetic waves) is used instead to develop property models over large areas. However, inversions of remotely sensed geophysical data are typically non-unique, that is, a range of geologic models is consistent with the measured data. Jointly inverting independent geophysical data sets has been proposed as a method to reduce ambiguity in the resulting property model (e.g., Vozoff and Jupp, 1975).

The concept of joint inversion is well known in the geophysics community.

Generally, a penalty function (sometimes called an objective function, a cost function, or a misfit function) is formulated as a function $F_j$ of observed geophysical data $d_j$ and predicted data $d_j^*(m)$ from the candidate subsurface model for each data type:

$$\Psi = \lambda_1 F_1(d_1, d_1^*(m)) + \lambda_2 F_2(d_2, d_2^*(m)) + \ldots + R(m) \quad (1)$$

The goal of the inversion is to determine the model m that minimizes equation (1). R(m) is a regularization term that places constraints on the model, for example, model smoothness or length. The variables $\lambda_i$ represent arbitrary weights that determine the relative contributions of the data types to the penalty function. In general, the inversion is non-linear and it is difficult to obtain a solution that satisfies equation (1) directly. Common solutions to this problem are to perform iterative inversions, using gradient based approaches or stochastic approaches (e.g., Monte Carlo or genetic algorithms).

A typical joint inversion algorithm is disclosed by Moorkamp et al. (2010), and is shown schematically in FIG. 1. Geophysical data 11 are collected over a region of interest. An initial property model 12 is estimated, and simulation data 14 is generated from the model. A joint penalty function 13 is constructed along the lines of equation (1) based on the measured data and simulated data. Convergence is tested at step 15 by determining whether the penalty function indicates an update is possible. If an update is possible, the property model is updated at step 16, and the inversion loop begins a new iteration. If an update is no longer possible, the inversion is said to have converged to a final property model 17 (or failed if the data is not sufficiently fit).

Geophysical data (FIG. 2) may include gravity data, electromagnetic data (magnetotelluric or controlled source), seismic data (active or natural source), or other types of data. Property models (FIG. 3) may include one or more rock properties, such as fluid saturation, porosity, resistivity, seismic velocity, density, lithology, or other properties.

The vast majority of joint inversion algorithms use constant weight values for the duration of the inversion (e.g. Lines et al., 1988, Johnson et al., 1996, Julia et al., 2000, Linde et al., 2006). Unfortunately, as weight choices are arbitrary, this may direct the solver through model space in an inefficient manner, resulting in an increased number of iterations to achieve convergence. Further, in many problems model space is populated with many models that are local minima of equation (1). These local minima can "trap" gradient based solvers, leading to incomplete convergence. This is diagramed in FIG. 4. Finally, if constant weights are used, several different inversion runs must be completed using different weights in order to find an optimal solution.

Colombo et al. (US patent application publication No. 2008/0059075) disclose a method for joint inversion of geophysical data and applications for exploration. However, as described above, their method is prone to trapping in local minima Tonellot et al. (US patent application publication No. 2010/0004870) also disclose a method for joint inversion of geophysical data, but their method uses constant weights on data terms as well. Both of these techniques would benefit from a new method to mitigate local minima.

Lovatini et al. (PCT patent application publication No. WO 2009/126566) disclose a method for joint inversion of geophysical data. The authors use a probabilistic inversion algorithm to search model space. These types of solvers are not hindered by local minima, but are much more computationally intensive than the gradient-based solvers to which the present invention pertains.

Publications in a variety of different fields describe methods to adaptively change weights. For example, in U.S. Pat. No. 7,895,562, Gray et al. describe an adaptive weighting scheme for layout optimization, in which the importance of a priority is scaled based on the magnitude of a lesser priority. Unfortunately, this method does not allow the priority weights to be adjusted during the solution of the layout optimization problem.

In U.S. Pat. No. 7,487,133, Kropaczek et al. describe a method for adaptively determining weight factors for objective functions. In this method, the data component with the highest penalty (i.e., the data component that contributes most to the objective function) receives an increased emphasis (weight) in a subsequent penalty function. However, simply increasing emphasis on the component with highest penalty can result in misleading results if that component is trapped in a local minimum. In this situation, increasing the weight of this component will ultimately result in a converged result. Though other components are not satisfied, they are down-weighted in the penalty function and therefore no longer contribute to the final model.

Chandler presents a joint inversion method in U.S. Pat. No. 7,383,128 using generalized composite weight factors that are computed during each solver iteration. These weight factors are related to the independent variables (i.e., data). In this method the weights are chosen in such a way as to render error deviations to be represented by a non-skewed homogeneous uncertainty distribution. However, this method requires the input of a priori error estimates and is limited to two-dimensional problems, and is not applicable to joint inversion of multiple independent data sets because the derivation of this method is limited to variables that can be represented as "orthogonal coordinate-oriented data-point projections," which is not the case for geophysical data sets.

Adaptive weights have also been considered in applications to neural network optimization algorithms. For example, Yoshihara (U.S. Pat. No. 5,253,327) discloses a method in which synaptic weights are changed in response to the degree of similarity between input data and current synaptic weight. This emphasizes connections with high importance in the network, resulting in a more efficient search of model space. Unfortunately this and similar disclosures (for example, Jin et al., U.S. Pat. No. 7,363,280, or Ehsani et al., U.S. Pat. No. 5,917,942) actually are "adaptive learning" systems, in which past searches of model space are used to guide the future search of model space. While this can help avoid local minima and can result in more efficient computation in some situations, it depends on historical experience in the solution space, rather than intrinsic properties of the data themselves.

SUMMARY OF THE INVENTION

The present invention is a method for adaptive weighting of geophysical data in joint inversion. Joint inversion is a process by which an optimal model is obtained that simultaneously satisfies multiple constraints. Generally, weights may be specified to emphasize or to help balance the contributions of each data type in the optimization process.

The present inventive method relies on the realization that different geophysical data constrain different portions of the model space, and further, that an optimal model may be found by designing a weighting scheme that emphasizes fitting some portion of data space over others at different times during the inversion. Further, the present inventive method recognizes that a local minimum of the objective function may result from a subset of one or more but less than all of the data types in the inversion. Finally, the inventive method emphasizes the fact that in the true global minimum, each individual penalty term for each data type alone should be irreducible by further iteration (neglecting regularization, e.g. smoothing or normalization, or the presence of noise).

The present inventive method comprises the following basic steps: (1) obtain at least two geophysical data types over the region of interest; this may include a variety of data types. (2) Select an objective function, and determine inversion convergence criteria. This can be the same criterion by which it is judged whether convergence has been reached in the iterative joint inversion, e.g. in step 15 of FIG. 1. (3) Perform joint inversion, but when the convergence criteria are met, instead of ending the process, construct a modified objective function emphasizing, e.g. by changing weighting functions relative to each other, each separate data type in turn. If the modified objective functions do not further minimize the misfit, the solution is converged; otherwise, update the model according to the non-converged modified objective functions.

The present inventive method does not require any computationally expensive forward modeling steps beyond what is normally performed in gradient-based inversions, as the modified objective functions can be constructed from each iteration's existing forward simulated data. Further, this approach mitigates the effect of local minima on inversion convergence, yielding improved inversion accuracy.

In one of its embodiment, the present invention is a method for simultaneously determining a model for each of a plurality of physical properties of a subsurface region by iterative joint inversion of a plurality of corresponding geophysical data types, comprising using a computer to minimize a penalty function to determine model updates for a next iteration cycle, said penalty function containing a separate weighted term for each data type, wherein the penalty function weights are changed when one or more convergence criteria are satisfied.

BRIEF DESCRIPTION OF THE DRAWINGS

The present invention and its advantages will be better understood by referring to the following detailed description and the attached drawings in which.

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims. Persons skilled in the technical field will readily recognize that in practical applications of the present inventive method, it must be performed on a computer, typically a suitably programmed digital computer.

DETAILED DESCRIPTION OF EXAMPLE EMBODIMENTS

Figure 1:
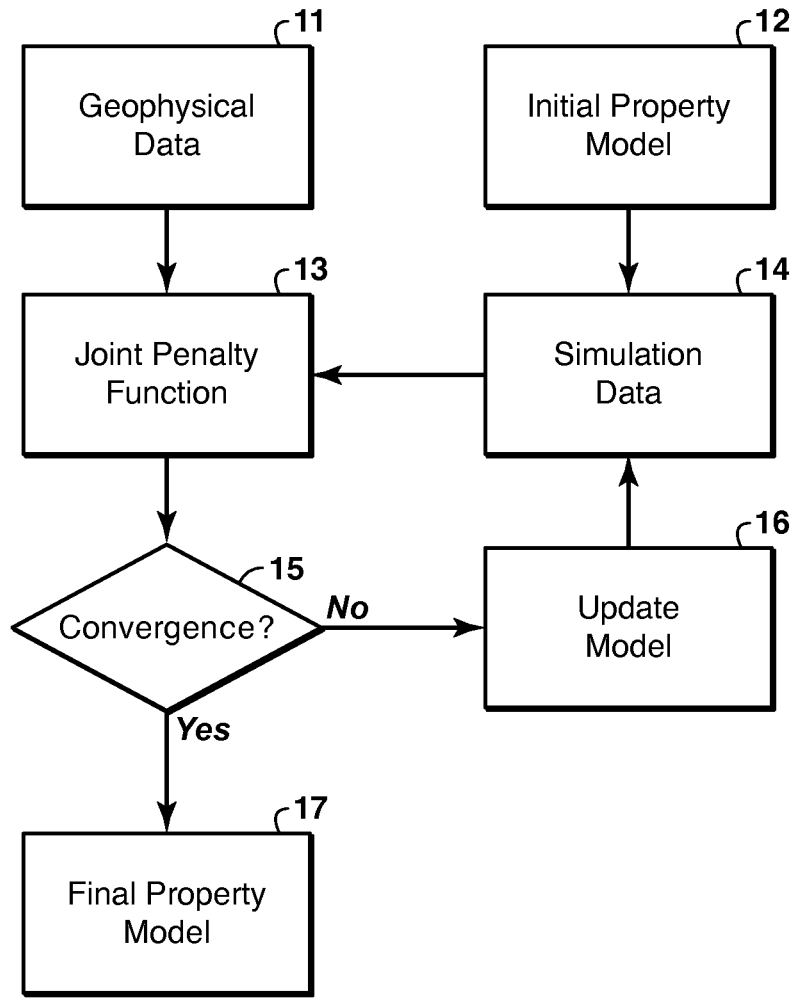
FIG. 1 is a flowchart showing basic steps in a conventional joint inversion method.
Figure 2:
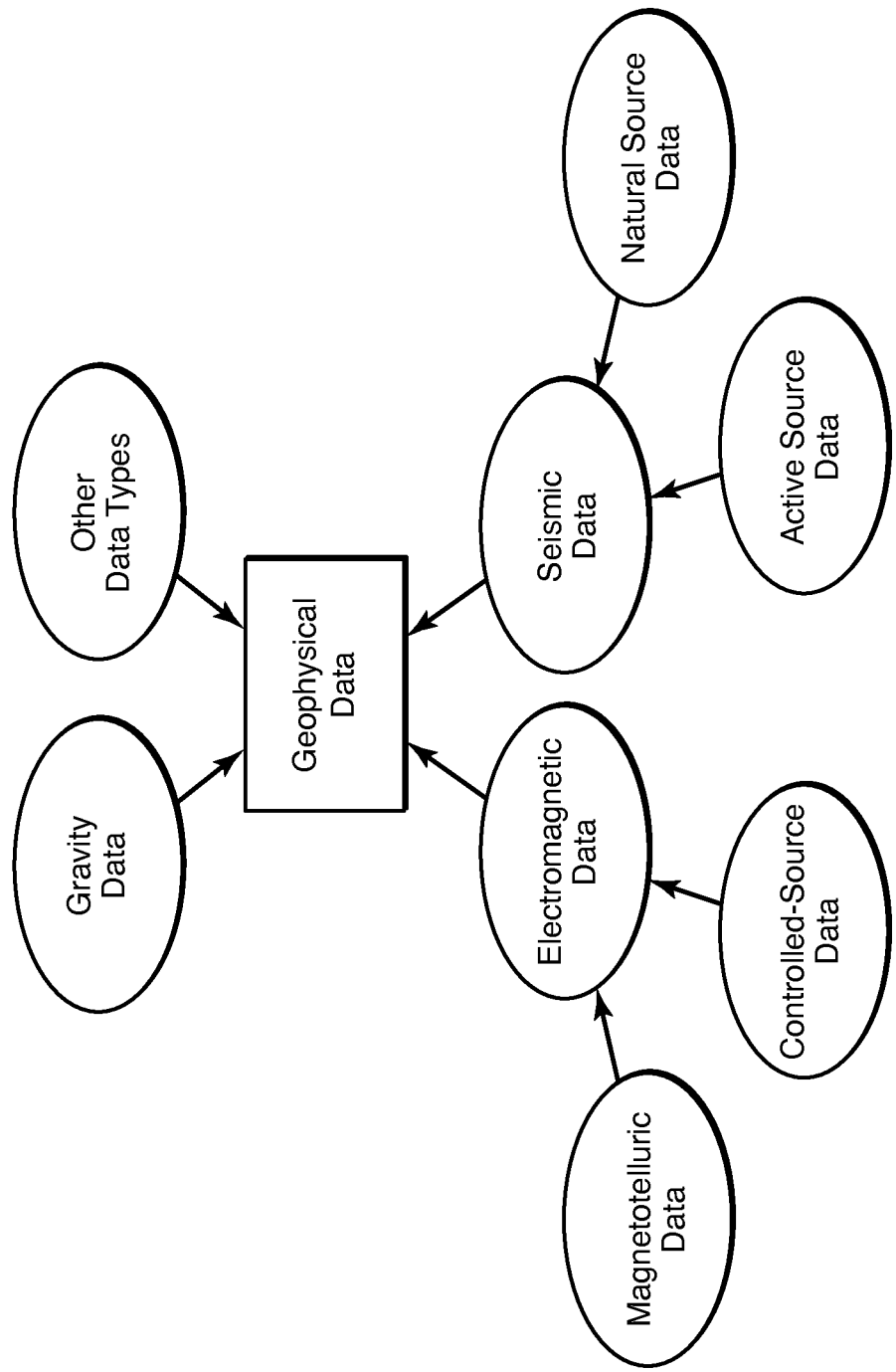
FIG. 2 is a diagram showing examples of different types of geophysical data.
Figure 3:
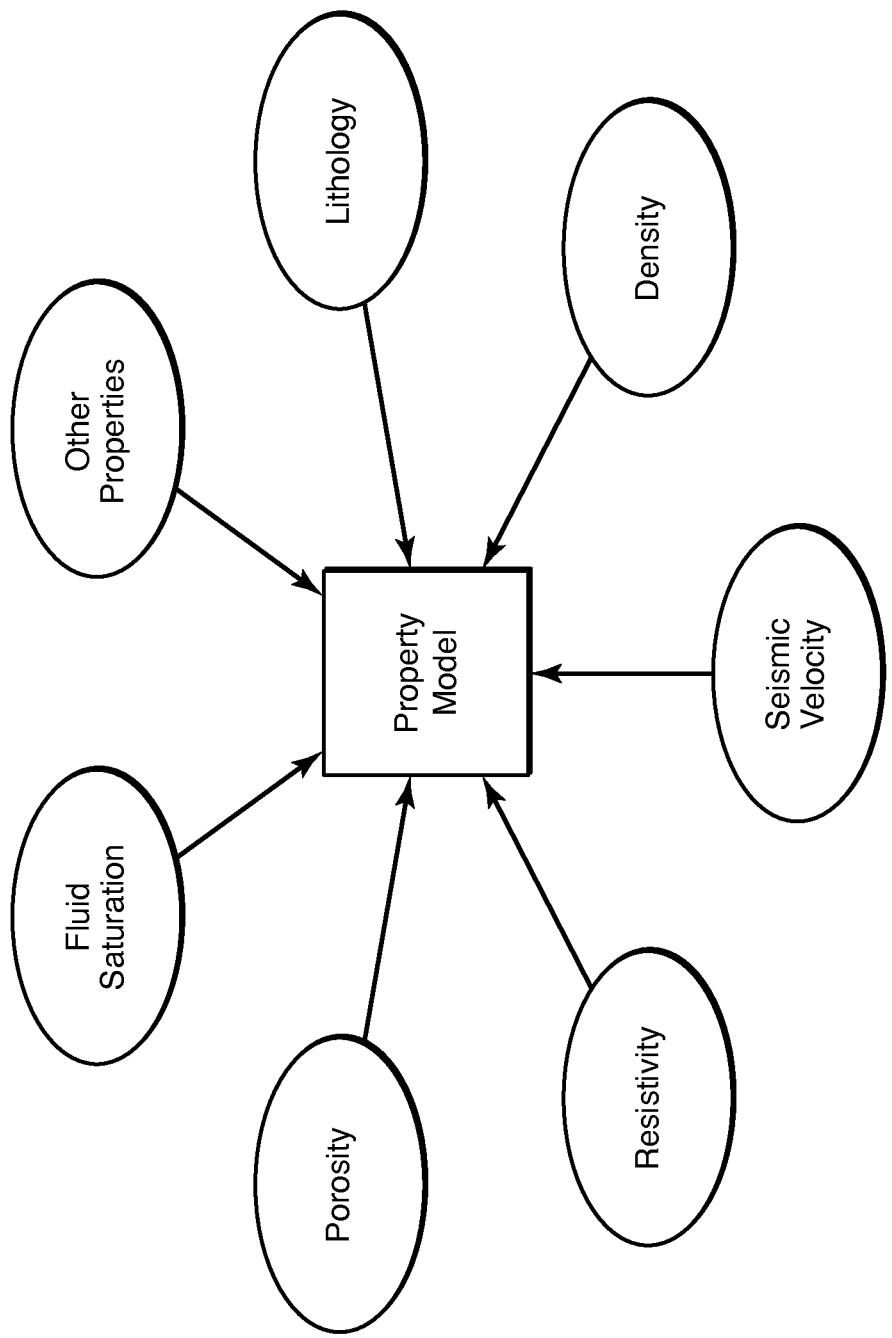
FIG. 3 is a diagram showing examples of different types of model properties.
Figure 4:
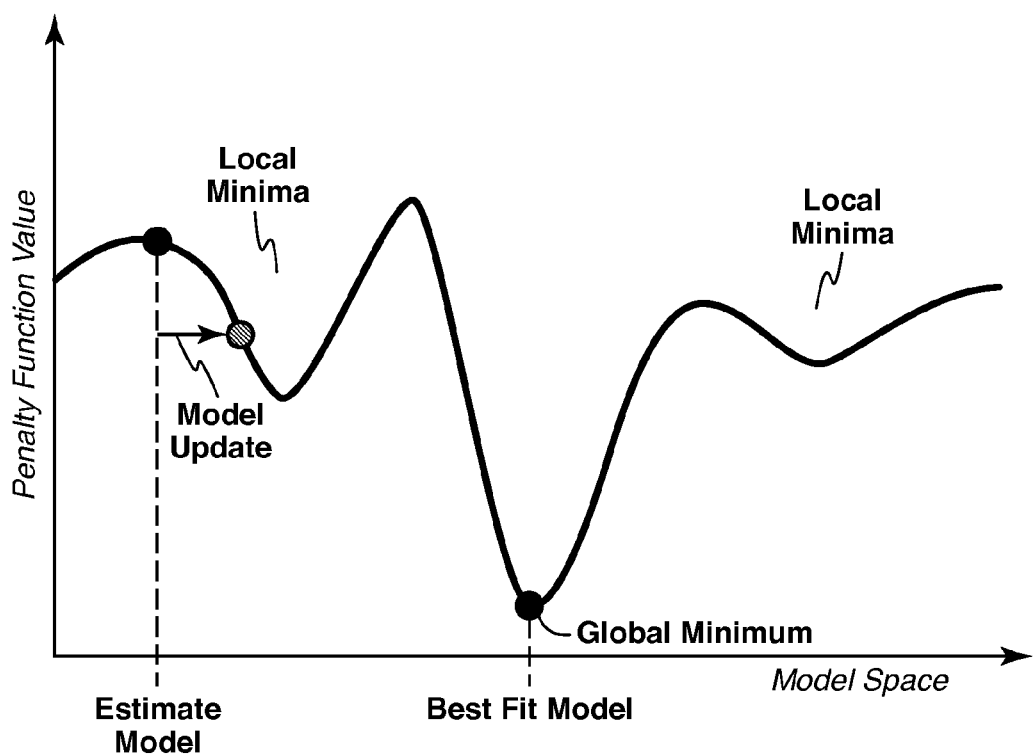
FIG. 4 illustrates various minima in a joint inversion penalty function.
Figure 5:
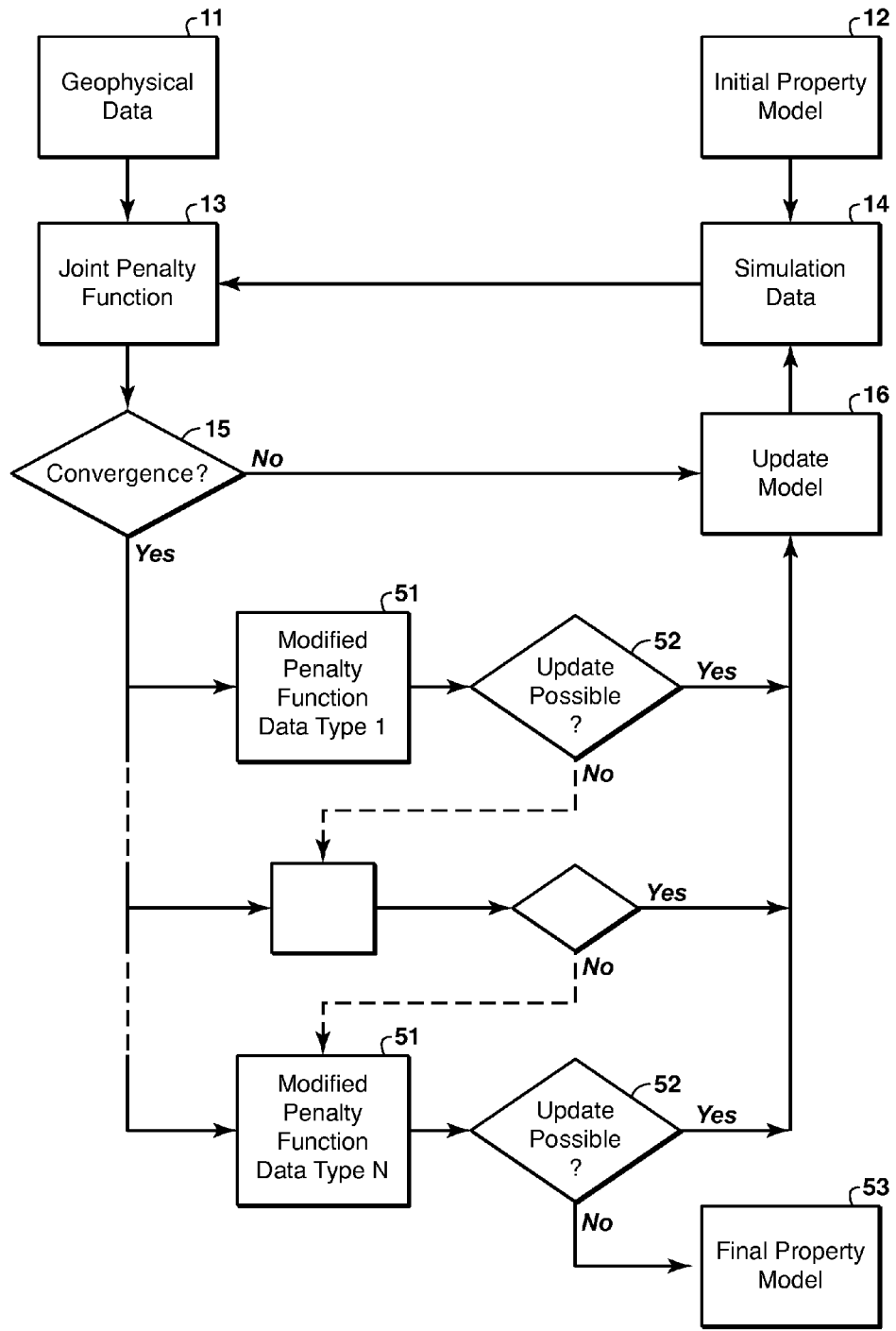
FIG. 5 is a flowchart showing basic steps in one embodiment of the present inventive method for joint inversion with adaptive weighting.

FIG. 5 provides an overview of how the present invention can be incorporated into a typical joint inversion methodology such as that outlined in the flowchart of FIG. 1. The inversion proceeds according to FIG. 1 until convergence has been reached. This superposition in FIG. 5 of additional steps from the present invention onto the traditional steps in FIG. 1 is emphasized by repeating the FIG. 1 reference numbers for those traditional steps. At this point, i.e. achieving a "yes" result in step 15, in a conventional joint inversion, it is not determined whether the solution is in a local minimum (failed convergence) or the global minimum (final property model). One merely hopes that the process has converged at the global minimum.

Convergence criteria of the present inventive method may be as simple as tolerances on minimum change in misfit values, for a particular data type or the combined misfit function, from one iteration to the next. If the change in misfit values is less than this tolerance at any time during the inversion, this can be used as an indication that the objective function needs to be modified. One could be more sophisticated: in addition to misfit values, a norm (such as the average of the absolute value) of the gradient of the misfit with respect to the model parameters could be monitored during the inversion, and if the norm falls below a certain threshold, this could be indicative of a local minimum for that data type. The subsequent iterations can then be carried out with less emphasis on this data type. These are two possible choices of convergence criteria, but any criteria that may be used at step 15 in the flowchart of FIG. 1 may be used in the present inventive method.

In the present inventive method, when convergence is reached at step 15, i.e. model updates are no longer found to be possible, instead of merely assuming that a global minimum of the penalty function has been attained, the penalty function is modified by changing the weights of one or more of the data types at step 51. Then, at step 52 the optimizer determines whether an update is now possible. This determination may be made separately for each data type. If no update is possible the current property model is taken to be the final property model 53. If an update is possible, that update is made at step 16 and the method cycles again through traditional steps 14, 13 and 15, and so on as before. An update is not "possible" when, to use a gradient-based optimizer as an example, the gradients of the penalty function with respect to the property parameters are all zero to within a preselected tolerance. Step 52 may use the same convergence criteria as step 15; i.e. at step 52, the convergence criteria would be reapplied to the objective function where the weights have been changed.

Figure 6:
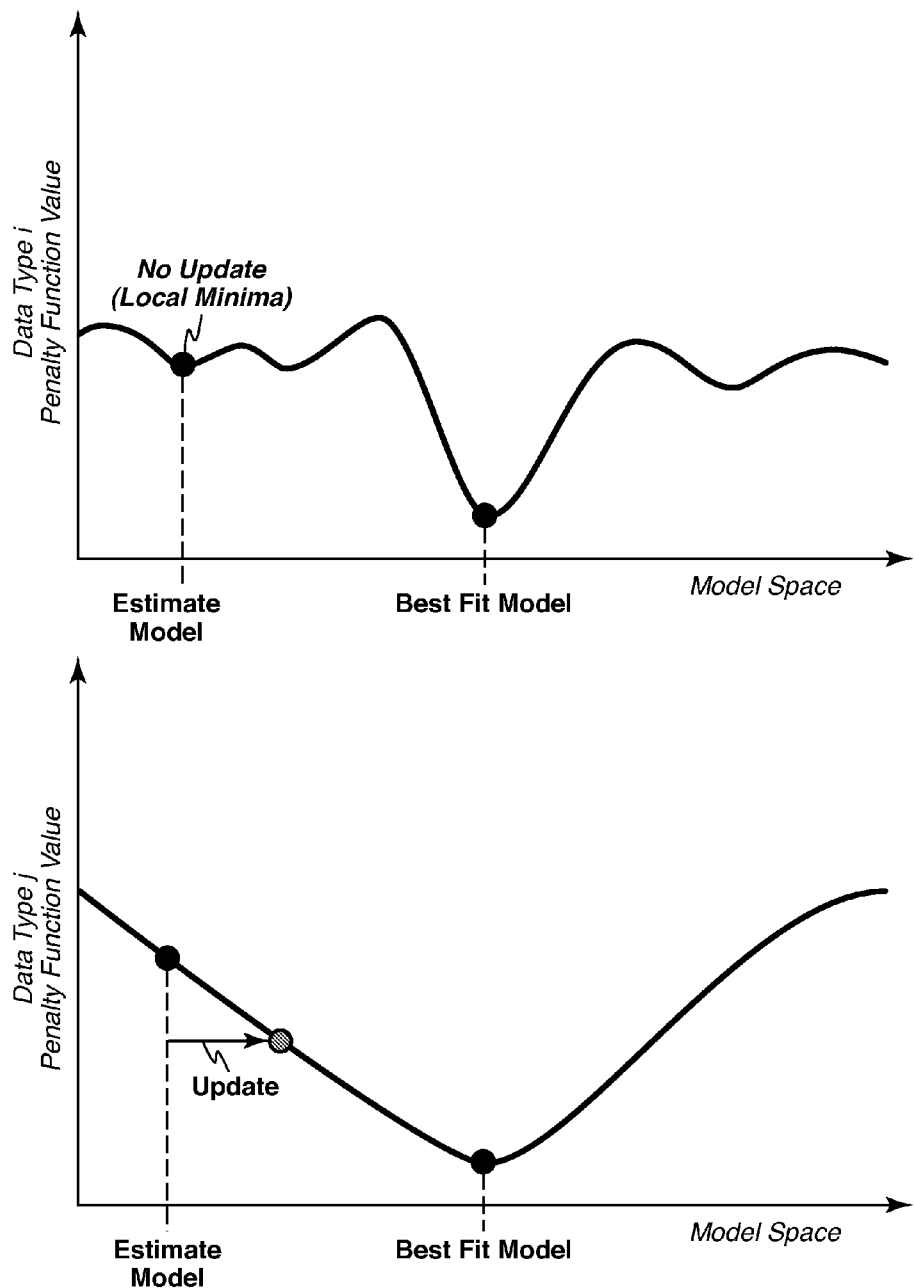
FIG. 6 illustrates how an adaptive weighting scheme of the present invention permits inversion to escape local minima.

In the present inventive method, the penalty function may be modified by changing the data type weights to emphasize, in turn, each individual data type in the inversion. This modification can be achieved by increasing the weight of one data type relative to another, or, setting the weights of all other data types to zero. An example of two penalty functions is given in FIG. 6. Each time a different data type is emphasized, the optimizer determines whether an update to the model is possible. If, after examining all data types, no update is possible, the solution is deemed converged (or failed if the data is not fit). If one or more data types indicate a possible update, an update is constructed and the inversion proceeds. This method should result in optimized models for all data types unless one data type is stuck in a local minimum and has no direct or indirect cross-sensitivity to any other data type in the joint inversion.

Expanding on this last point, in general, a single data type can yield a single update to the model. However, one or more data types may constrain the same rock properties, or, may constrain different rock properties. If the data types and rock properties are completely orthogonal, an update is not likely to move the estimated property model out of a local minimum. If, on the other hand, data types share some sensitivity to a given property (for example, both seismic waves and gravity are sensitive to density), emphasizing one type (e.g., gravity) will move the model from a local minima caused by another type (e.g., seismic).

Practically speaking, once it is determined which data type is causing the local minimum, which the convergence tests of the present inventive method enable one to do, this data type may be deemphasized for one or more iterations until the model is sufficiently far from the local minimum as to resume convergence towards the global minimum. By deemphasizing the data causing the local minimum, that barrier to convergence is being removed. It may seem that it might be a better idea to instead work with the data causing the local minimum, but in practice that is very difficult to do, because it is essentially impossible to predict what size bump to those model parameters is necessary to move out of the minimum.

An alternative embodiment of the invention involves changing the penalty function weights at one or more, possibly all, iterations. This achieves the same result, as the final solution should be consistent with all data regardless of the weight in the penalty function. In principle, this can be achieved through a specified weighting routine, or even at random.

It can be seen that the present inventive method differs from (a) Gray because the weights change during the optimizing process; (b) Kropaczek because the weights change is triggered by satisfying the convergence criteria rather than changing on every cycle for the data component with greatest misfit; (c) Chandler because no prior uncertainty estimates are required, and because geophysical data are not orthogonal coordinate-oriented data-point projections; and (d) Yoshihara when the weights change depends on the data (through the convergence criteria), not on training a neural network based on past experience unrelated to the data. Other differences exist, but the ones mentioned are prominent.

The foregoing patent application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

REFERENCES

Chandler, L. S. "Implementing two dimensional segment inversions with inversion-conforming data sets processing being rendered to include generalized composite weight factors in the processing of error-affected multivariate data samples," U.S. Pat. No. 7,383,128 (2008).

Colombo, D. and M. De Stefano. "Methods and apparatus for geophysical exploration via joint inversion," US Patent Appl. No. 2008/0059075 (2008).

Ehsani, F., L. Zhou, J. L. C. Seybold, E. B. Sherwin, K. J. Guzik. "Device and method for handwriting recognition with adaptive weighting of recognition data," U.S. Pat. No. 5,917,942 (1999).

Gray, M. S., M. T. Guzowski, K. W. McCullen, X. Tang, R. F. Walker, and X. Yuan, "Adaptive weighting method for layout optimization with multiple priorities," U.S. Pat. No. 7,895,562 (2011).

Jin, Y., and B. Sendhoff, "Methods for multi-objective optimization using evolutionary algorithms," U.S. Pat. No. 7,363,280 (2008).

Johnson, J. M., K. Satake, S. R. Holdahl, and J. Sauber. "The 1964 Prince William Sound earthquake: Joint inversion of tsunami and geodetic data," *J. Geophys. Res.* 101 (B1) 523-532 (1996).

Julia, J. C. J. Ammon, R. B. Herrmann, and A. M. Correig. "Joint inversion of receiver function and surface wave dispersion," *Geophys. J. Int.* 143, 99-112 (2000).

Kropaczek, D. J., W. C. Cline, W. E. Russel, II, "Method and apparatus for adaptively determining weight factors within the context of an objective function," U.S. Pat. No. 7,487,133 (2009).

Linde, N. A. Binley, A. Tryggvason, L. B. Pedersen, and A. Revil, "Improved hydrogeophysical characterization using joint inversion of cross-hole electrical resistance and ground-penetrating radar traveltime data," *Water Resources Res.* 42, W12404, doi:10.1029/2006WR005131 (2006).

Lines, L. R., A. K. Schultz, and S. Treitel, "Cooperative inversion of geophysical data," *Geophysics* 53(1), 8-20 (1988).

Lovatini, A., M. Watts, D. Rovetta, G. Bernasconi, and P. Mazzucchelli, "Joint inversion of time domain controlled source electromagnetic (TD-CSEM) data and further data," PCT International Patent Publication No. WO 2009/126566 (2009).

Moorkamp, M., B. Heincke, M. Jegen, A. W. Roberts, and R. W. Hobbs, "A framework for 3-D joint inversion of MT, gravity, and seismic refraction data," *Geophys. J. Int.* 184, 477-493 (2010).

Strack, K., H. Rueter, and A. Thomsen, "Integrated earth formation evaluation method using controlled source electromagnetic survey data and seismic data," U.S. Pat. No. 7,328,107 (2008).

Tonellot, T., M.-L. Bernard, and V. Clochard, "Method of joint inversion of seismic data represented on different time scales," US. Patent Appl. No. 2010/0004870 (2010).

Yoshihara, T., "Optimization Apparatus," U.S. Pat. No. 5,253,327 (1993).

Vozoff, K. and D. L. B. Jupp, "Joint inversion of geophysical data," *Geophys. J. R. astr. Soc.* 42, 977-991 (1975).

The invention claimed is:

1. A method for simultaneously determining a model for each of a plurality of physical properties of a subsurface region by iterative joint inversion of a plurality of corresponding geophysical data types, comprising using a computer to minimize a penalty function to determine model updates for a next iteration cycle, said penalty function containing a separate weighted term for each data type, wherein the penalty function weights are changed when one or more convergence criteria are satisfied.

2. The method of claim 1, wherein each iteration cycle of the joint inversion comprises simulating synthetic geophysical data using current models of the physical properties, and the penalty function measures degree of misfit between the synthetic data and corresponding measured data.

3. The method of claim 2, wherein the convergence criteria are based on a pre-selected tolerance for minimum change in misfit value, for a particular data type or for all data types combined, from one iteration to a next.

4. The method of claim 2, wherein when said one or more convergence criteria indicate convergence, the penalty function weights are changed in successive iterations to emphasize each data type in turn.

5. The method of claim 4, wherein an optimizer determines the model updates from the misfits, and wherein the iterative joint inversion is deemed finished when the optimizer can determine no update when each data type is emphasized in turn.

6. The method of claim 4, further comprising determining a particular data type causing said indicated convergence, and then deemphasizing that particular data type in one or more subsequent iterations.

7. The method of claim 1, wherein the convergence criteria are based on monitoring magnitude of model updates from one iteration to a next.

8. The method of claim 1, wherein each physical property model subdivides a volume of the subsurface region into discrete cells, and specifies a value of that physical property for each cell.

9. The method of claim 1, wherein the plurality of geophysical data types includes at least two of seismic data, electromagnetic data, gravity data, surface topography data, and surface displacement data.

10. The method of claim 1, wherein said plurality of physical properties includes at least two of fluid saturation, porosity, resistivity, seismic velocity, lithology, and density.

11. The method of claim 1, wherein the penalty function weights are changed in each iteration cycle in accordance with a predetermined scheme.

12. The method of claim 1, wherein the penalty function weights are changed at random in each iteration cycle.

13. The method of claim 1, wherein minimizing the penalty function comprises computing a gradient of the penalty function with respect to parameters of the model.

14. A computer program product, comprising a non-transitory computer usable medium having a computer readable program code embodied therein, said computer readable program code adapted to be executed to implement a method for simultaneously determining a model for each of a plurality of physical of a subsurface region by iterative joint inversion of a plurality of corresponding geophysical data types, said method comprising minimizing a penalty function to determine model updates for a next iteration cycle, said penalty function containing a separate weighted item for each data type, wherein the penalty function weights are changed when one or more convergence criteria are satisfied.

15. A method for producing hydrocarbons from a subsurface region, comprising:
 obtaining data resulting from at least two different types of geophysical surveys of the subsurface region;
 processing the two or more different types of geophysical data by jointing inverting them to infer two or more corresponding physical property models, said joint inversion using an iterative method comprising minimizing a penalty function to determine model updates for a next iteration cycle, said penalty function containing a separate weighted term for each data type, wherein the penalty function weights are changed when one or more convergence criteria are satisfied;
 using the physical property models resulting after convergence to determine hydrocarbon potential of the subsurface region; and
 in response to a positive indication of hydrocarbon potential, drilling a well into the subsurface region and producing hydrocarbons from it.

* * * * *